US009165081B2

(12) United States Patent
Nicolaou et al.

(10) Patent No.: US 9,165,081 B2
(45) Date of Patent: Oct. 20, 2015

(54) HOVERCARD PIVOTING FOR MOBILE DEVICES

(75) Inventors: Alexander Nicolaou, Waterloo (CA);
Joanne L. McKinley, Waterloo (CA);
Robert J. Kroeger, Waterloo (CA);
Brett R. Lider, San Francisco, CA (US);
Istiaque Ahmed, Kitchener (CA)

(73) Assignee: Google Inc., Mountain View, CA (US)

( * ) Notice: Subject to any disclaimer, the term of this patent is extended or adjusted under 35 U.S.C. 154(b) by 676 days.

(21) Appl. No.: 12/983,982

(22) Filed: Jan. 4, 2011

(65) Prior Publication Data

US 2012/0047422 A1    Feb. 23, 2012

Related U.S. Application Data

(60) Provisional application No. 61/374,441, filed on Aug. 17, 2010.

(51) Int. Cl.
*G06F 17/30* (2006.01)
*G06F 3/0484* (2013.01)
*G06F 3/0481* (2013.01)
*G06F 17/22* (2006.01)

(52) U.S. Cl.
CPC ........ *G06F 17/30873* (2013.01); *G06F 3/0481* (2013.01); *G06F 3/04842* (2013.01); *G06F 17/2235* (2013.01); *G06F 17/30893* (2013.01)

(58) Field of Classification Search
CPC .......... G06F 17/2235; G06F 17/30884; G06F 17/30893; G06F 3/0481; G06F 3/048; G06F 3/04842
USPC .......................................... 715/201, 205, 208
See application file for complete search history.

(56) References Cited

U.S. PATENT DOCUMENTS

| | | | |
|---|---|---|---|
| 8,060,570 B2 * | 11/2011 | Pousti et al. | 709/206 |
| 2004/0167813 A1 * | 8/2004 | Robertson et al. | 705/8 |
| 2008/0201437 A1 | 8/2008 | Ludwig et al. | |
| 2009/0171979 A1 * | 7/2009 | Lubarski et al. | 707/10 |
| 2010/0268793 A1 * | 10/2010 | Wolff et al. | 709/217 |
| 2010/0281113 A1 * | 11/2010 | Laine et al. | 709/204 |
| 2011/0035673 A1 * | 2/2011 | Chou et al. | 715/739 |
| 2011/0105095 A1 * | 5/2011 | Kedefors et al. | 455/418 |

(Continued)

OTHER PUBLICATIONS

OpenContacts Manual, Archived at least prior to Mar. 3, 2009 http://fonlow.com/opencontacts/Manual/.*

(Continued)

*Primary Examiner* — Adam M Queler
(74) *Attorney, Agent, or Firm* — Fish & Richardson P.C.

(57) ABSTRACT

Methods, systems, and apparatus, including computer programs encoded on a computer storage medium, for invoking execution of web based applications. In one aspect, a method includes receiving user input at a computing device, displaying a contact hovercard on a display of the computing device in response to the user input, the contact hovercard including first contact data and second contact data, the first contact data corresponding to a first web application and the second contact data corresponding to a second web application, the first web application and the second web application being executed on one or more servers, receiving user input selecting the first contact data, generating a user interface and accessing the first web application over a network in response to receiving the user input selecting the first contact data, and providing the first contact data as input to the first web application.

19 Claims, 4 Drawing Sheets

(56) References Cited

U.S. PATENT DOCUMENTS

2011/0252011 A1* 10/2011 Morris et al. .................. 707/706
2011/0270705 A1* 11/2011 Parker ........................ 705/26.61

OTHER PUBLICATIONS

John Mott, Developing Web Application, Jun. 30, 1998, ftp://ftp.sandh.com/tsx/IPL/DEVWEB.DOC.*

OpenContracts Manual, Archived at least prior to Mar. 3, 2009, http://fonlow.com/opencontracts/Manual, 69 pages.

Authorized Officer Doreen Golze, International Search Report and the Written Opinion of the International Searching Authority for Application No. PCT/US2011/048068 dated Nov. 7, 2011, 11 pages.

Lebens, Beau, "Gravatar Blog—Now with Full Profiles," Mar. 26, 2010, http://blog.gravatar.com/2010/03/26/gravatar-profiles/.

Authorized Officer Simin Baharlou, International Preliminary Report on Patentability for Application No. PCT/US2011/048068 mailed Feb. 28, 2013, 7 pages.

* cited by examiner

US 9,165,081 B2

HOVERCARD PIVOTING FOR MOBILE DEVICES

CROSS-REFERENCE TO RELATED APPLICATIONS

This application claims priority to U.S. App. No. 61/374,441 filed on Aug. 17, 2010, the disclosure of which is expressly incorporated herein by reference in its entirety.

BACKGROUND

This specification generally relates to mobile devices, and more particularly to a contact hovercard that provides a bridge to and between web applications executed using a mobile device.

A user of a mobile computing device can interact with multiple productivity and communications web based applications. The web based applications can include, for example, an email application, a calendar application, a social networking application, an instant messaging application, a telecommunications service application and a video and/or voice over internet protocol (VOIP) application. Each application can present to the user a unique user interface and experience.

SUMMARY

According to one innovative aspect of the subject matter described in this specification, a mobile computing device can be used to execute one or more mobile device applications included in a suite of mobile productivity and communications applications. The mobile productivity and communications applications can be web based applications that have in common a need for contact information. In some implementations, each mobile productivity and communications application can access a common contact hovercard that functions as an interface including the contact information for a specific selected individual. The contact information can be contact data for the individual that can include, for example, email addresses, phone numbers, and street addresses.

In general, another innovative aspect of the subject matter described in this specification may be embodied in methods that include the actions of receiving user input at a computing device, displaying a contact hovercard on a display of the computing device in response to the user input, the contact hovercard including first contact data and second contact data, the first contact data corresponding to a first web application and the second contact data corresponding to a second web application, the first web application and the second web application being executed on one or more servers, receiving user input selecting the first contact data, generating a user interface and accessing the first web application over a network in response to receiving the user input selecting the first contact data, and providing the first contact data as input to the first web application. Other implementations of this aspect include corresponding systems, apparatus, and computer programs, configured to perform the actions of the methods, encoded on computer storage devices.

These and other implementations may each optionally include one or more of the following features. For instance, the operations may further include transmitting a request to the one or more servers, and receiving, from the one or more servers, the contact hovercard in response to the request; the operations may further include receiving, from the one or more servers, the first contact data and the second contact data in response to the request; the operations may further include, subsequent to generating and providing, receiving user input selecting the second contact data, generating the user interface and accessing the second web application over the network in response to receiving the user input selecting the second contact data, and providing the second contact data as input to the second web application; the operations may further include accessing the second web application, the second web application displaying a list of contacts on the display, wherein receiving user input includes receiving user input selecting a contact from the list of contacts, the contact hovercard corresponding to the contact; the first contact data and the second contact data may each be displayed as a hyperlink to the first and second web applications, respectively; the first web application and the second web application may each include one of an email application, a social networking application, an instant messaging application, a telephone service application, a calendar application, and a video and/or voice over internet protocol (VOIP) application; the operations may further include displaying a list of contacts on the display, the user input corresponding to a selected contact of the list of contacts and the contact hovercard corresponding to the selected contact, wherein the list of contacts includes one or more contacts associated with a user profile of a user of the computing device; the contact hovercard may correspond to a particular contact and is stored at a central repository as the only hovercard available for the particular contact; the contact hovercard may further include third contact data, the third contact data corresponding to a third web application that is executed on the one or more servers; the operations may further include retrieving a contact hovercard template from computer memory, retrieving the first contact data and the second contact data from computer memory, and populating the contact hovercard template with the first contact data and the second contact data to provide the contact hovercard, the computer memory may be provided at the one or more servers and/or at the computing device; the operations may further include storing the first contact data and the second contact data in digital memory of the mobile computing device, receiving updated first contact data from the one or more servers in response to the user input, and updating the first contact data using the updated first contact data.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers represent corresponding parts throughout.

DETAILED DESCRIPTION

Figure 1:
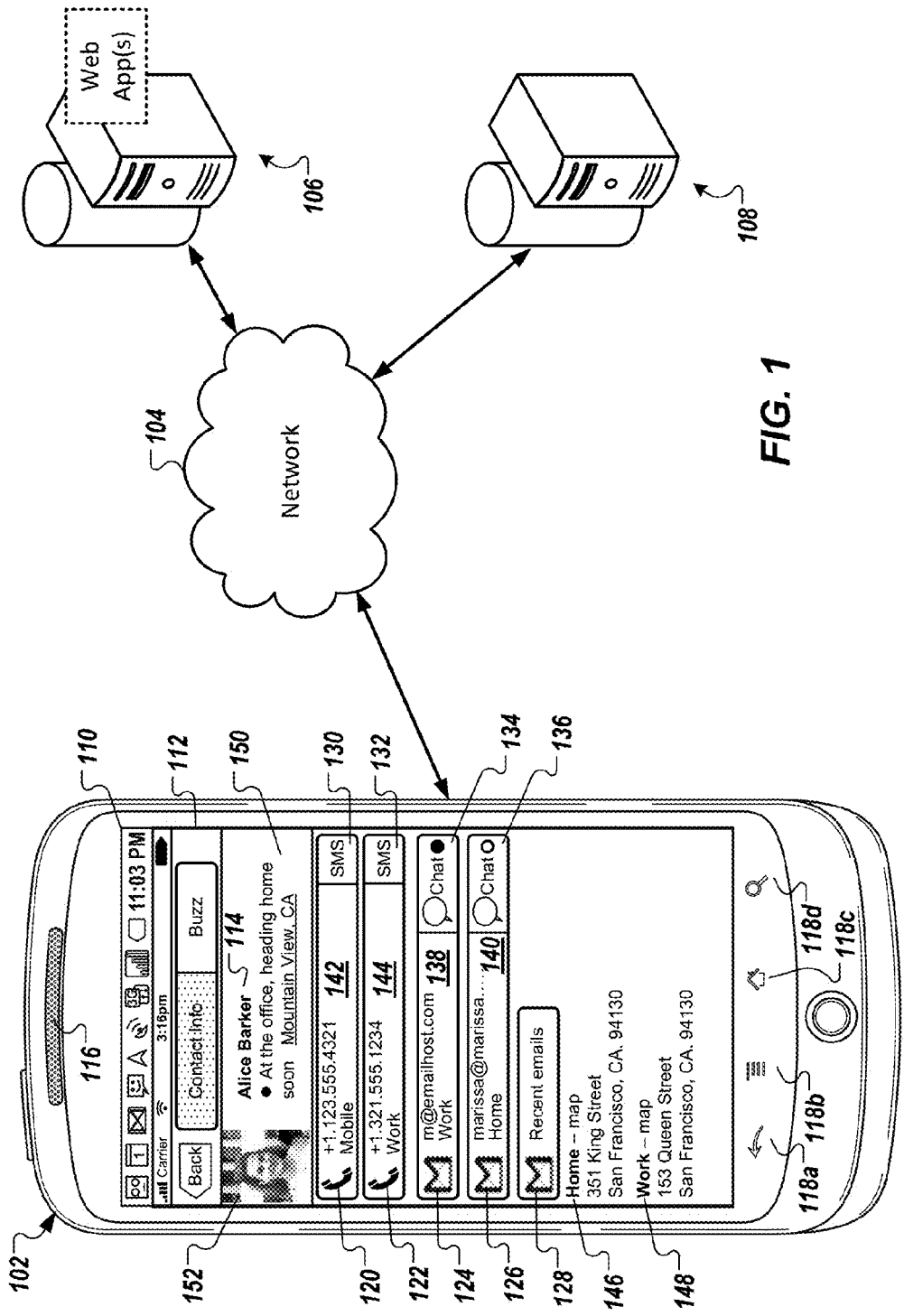
FIG. 1 illustrates an example system architecture including a mobile computing device that displays a contact hovercard.

FIG. 1 illustrates an example system architecture including a mobile computing device 102 that displays a contact hovercard 112. The mobile computing device 102 communicates with a network 104 and one or more server systems 106, 108.

The network can be provided as a large computer network, such as a local area network (LAN), wide area network (WAN), the Internet, a cellular network, or a combination thereof connecting any number of computing devices. A touchscreen display 110 of the mobile computing device 102 displays the contact hovercard 112 for an individual contact 114 (e.g., Alice Barker). As used herein, the term contact hovercard refers to a graphical user interface that displays contact information or data associated with a particular contact. The contact data can be presented in the contact hovercard as a link to invoke execution of a corresponding web based application. A contact can include, for example, a person and/or an entity, such as a company or institution (e.g., hospital, museum, library), and/or a government agency (e.g., police department, fire department).

A user of the mobile computing device 102 can launch a web based application, such as mobile productivity and communications web based applications, using the mobile computing device 102. As used herein, the terms web based application or web application refer to a computer software application that is accessed over a network, and/or a computer software application that is hosted in a browser-controlled environment or coded in a browser-supported language and reliant on a common web browser to render the application executable. Each web based application, though different in the service provided to the user, has the common need for contact data (e.g., email addresses, phone numbers, street addresses, etc.).

In some implementations, the web based application is an application that is accessed using the network 104 and executed on a server (e.g., server 106). The web based application can be a computer software application that is hosted in a browser-controlled environment or that is coded in a browser-supported language and is reliant on a common web browser to render the application executable. In general, a client-server relationship is established between the mobile computing device 102 and the one or more servers 106, 108, in which a user interface (e.g., web browser) is provided on the client side (e.g., the mobile computing device 102) for receiving user input to and providing output from the application being executed on the one or more servers.

In FIG. 1, the mobile computing device 102 is depicted as a handheld mobile telephone (e.g., a smartphone or an application telephone) that includes the touchscreen display 110 for presenting content (e.g., the contact hovercard 112) to a user of the mobile computing device 102. The mobile computing device 102 includes various input devices (e.g., the touchscreen display device 110, a keyboard (not shown)) for receiving user input that influences the operation of the mobile computing device 102. In further implementations, the mobile computing device 102 may be a laptop computer, a tablet computer, a personal digital assistant, an embedded system (e.g., a car navigation system), a desktop computer, or a computerized workstation.

The mobile computing device 102 may include various visual, auditory, and tactile user-output mechanisms. An example visual output mechanism is the touchscreen display 110, which can visually display video, graphics, images, and text that combine to provide a visible user interface. An example tactile user-output mechanism is a small electric motor that is connected to an unbalanced weight to provide a vibrating alert (e.g., to silently vibrate the mobile computing device 102 to alert a user of an incoming telephone call or confirm user contact with the touchscreen display 110). The mobile computing device 102 may include one or more speakers 116 that convert an electrical signal into sound, for example, music, an audible alert, or voice of an individual in a telephone call. The mobile computing device 102 may include mechanical or touch sensitive buttons 118a-d.

The mobile computing device 102 can determine a position of physical contact with the touchscreen display 110 (e.g., a position of contact by a finger or a stylus). Using the touchscreen display 110, various "virtual" input mechanisms may be produced, where a user interacts with a graphical user interface element depicted on the touchscreen display 110 by contacting the graphical user interface element.

The mobile computing device 102 may present a graphical user interface (e.g., the contact hovercard 112) with the touchscreen display 110. A graphical user interface is a collection of one or more graphical user interface elements and may be static (e.g., the display appears to remain the same over a period of time), or may be dynamic (e.g., the graphical user interface includes graphical user interface elements that animate without user input).

A graphical user interface element may be text, lines, shapes, images, or combinations thereof. For example, a graphical user interface element may be an icon that is displayed on the touchscreen display 110 and the icon's associated text. In some examples, a graphical user interface element is selectable with user-input. For example, a user may select a graphical user interface element (by pressing a region of the touchscreen display 110 that corresponds to a display of the graphical interface element). In some examples, the user may manipulate a trackball to highlight a single graphical user interface element as having focus. User-selection of a graphical user interface element may invoke a pre-defined action by the mobile computing device 102. In some examples, selectable graphical interface elements further or alternatively correspond to a button on a keyboard included with the mobile computing device. User-selection of the button may invoke the pre-defined action. As shown in FIG. 1, graphical user interface elements can be phone icons 120, 122, email icons 124, 126, 128, Short Message Service (SMS) buttons 130, 132, and chat buttons 134, 136.

In some implementations, a user of the mobile computing device 102 can launch a mobile productivity and communications web based application using the mobile computing device 102. The mobile productivity and communications web based application can be, for example, a maps application, an email application, a calendar application, a social networking application, an instant messaging application, a telecommunications service application, a video and/or VOIP application or any application that utilizes contact data. Contact data can include, for example, email addresses, phone numbers, user identifications (user IDs), and/or street addresses. As described, the mobile computing device 102 can access the web based application using the network 104. The web based application can reside on one or more servers (e.g., server 106).

In some implementations, to access a desired web based application, a user selects an individual contact from a contact list. As discussed herein, the contact list can be stored in memory of the mobile computing device and/or can be retrieved from one or more servers (e.g., server 108) over the network 104. Upon selection of the particular contact, the mobile computing device 102 displays a contact hovercard 112 specific to that contact on the touchscreen display 110. The contact hovercard 112 includes all of the currently available contact data for the particular contact. In the example contact hovercard 112 of FIG. 1, contact data for contact 114 (Alice Barker) is populated into the contact hovercard 112.

As discussed in further detail herein, the user can invoke execution of a web based application by selecting particular contact data presented in the contact hovercard 112. Once operating in the web based application, the user can access the same contact hovercard 112 or another contact hovercard from the web based application. In this manner, each contact hovercard provides a gateway to one or more web based applications and as a pivot or bridge between web based applications and other contact hovercards.

In the example contact hovercard 112 of FIG. 1, the contact data includes email addresses 138, 140, mobile phone number 142, work phone number 144, home address 146 and work address 148. The contact hovercard 112 can include a dynamic graphical user interface element 150 that displays a status message and current location of the contact. The contact hovercard 112 can also display a contact picture 152.

In some implementations, one or more contact data databases can be provided at one or more server systems (e.g., server system 108). The databases can store contact data. In some implementations, contacts can maintain contact information in the database. For example, a contact can build a profile that includes contact data such as one or more email addresses, one or more mailing addresses, one or more telephone numbers, and/or one or more user IDs corresponding to web based applications, for example. The contact data for the individual contact can be stored in the contact data databases and associated with that contacts profile. A user may be provided access to the contact's contact data. In some implementations, for example, the contact can approve one or more users as authorized users that are able to access and view the contact's contact data.

As discussed above, a user of a mobile computing device can access a contact list. The contact list will be populated with contact data that the respective contact's have authorized the user to have access to, and/or with contact data that the user has input themselves. The user can select a particular contact from the contact list to be presented with and view a contact hovercard associated with the particular contact.

In some implementations, the contact hovercard and underlying contact data can be retrieved over the network. In this manner, the displayed contact hovercard can be populated with the most recent contact data for the particular contact as stored in a central repository (e.g., server system 108). In some implementations, contact data can be cached locally on the mobile computing device, and, when the user selects a particular contact from a contact list, the contact data can be retrieved from the locally cached contact data and the displayed hovercard can be populated. Cached content is refreshed over the network each time the hovercard application starts.

In some implementations, the contact hovercard 112 can be stored as a template in a central repository (e.g., digital memory of the mobile computing device, an html5 database of a web browser executed by the mobile device), which communicates with the mobile computing device over the network. For example, when a user selects a contact from a contact list, the mobile computing device can retrieve a contact hovercard template from the central repository and can populate the contact hovercard with contact data for the selected contact. The contact data can be retrieved from the central repository and/or from a local cache of the mobile computing device.

In some implementations, the contact hovercard can be stored as a template in a local cache of the mobile computing device (e.g., digital memory of the mobile computing device). For example, when a user selects a contact from a contact list, the mobile computing device can retrieve a contact hovercard template from the local cache and can populate the contact hovercard with contact data for the selected contact. The contact data can be retrieved from a central repository (e.g., server system 108) over a network, and/or from the local cache of the mobile computing device.

In some implementations, the mobile computing device 102 may be "offline" (e.g., not connected to the network 104) and therefore, the mobile computing device 102 may not access the server systems 106, 108 in order to retrieve the contact hovercard and/or contact data. Consequently, the mobile computing device 102 may be used to retrieve locally cached contact hovercards and contact data. In such scenarios, the user may not be able to invoke execution of the web based application. However, the user can be provided with limited functionality. For example, the user may be able to prepare a draft email, instant message, native phone call or native SMS, and/or other communication using an "offline" version of the web based application that executes on the mobile computing device 102. In such cases, the contact hovercard can be provided as an HTML web page, for example, that is stored locally on the mobile computing device 102. The draft email, instant message and/or other communication can be queued for subsequent transmission once the mobile computing device 102 is back in communication with the network 104.

In some implementations, the mobile computing device 102 can determine where to retrieve the contact hovercard (e.g., contact hovercard 112) and contact data to populate the contact hovercard 112 based on a status of the network connection between the mobile computing device 102 and the network 104. For example, if the network data transfer speed is deemed to be slow (e.g., a current bit transfer rate is lower than a predetermined threshold), the mobile computing device 102 can use some or all of its locally cached data to display and populate the contact hovercard 112 to decrease the amount of time from the selection of the contact by the user to the display of the contact hovercard 112 to the user.

In some implementations, the mobile computing device 102 may first populate the contact hovercard 112 with locally cached contact data and can subsequently access the contact data stored at the central repository (e.g., server system 108). The mobile computing device 102 can compare the stored contact data retrieved from the central repository to the locally cached contact data. If the contact data has changed, the mobile computing device 102 can update the locally cached contact data and update the displayed contact data in the contact hovercard 112. Using locally cached data to initially populate the contact hovercard 112 decreases the amount of time between the selection of a contact by a user and display of the contact hovercard 112. In some implementations, the mobile computing device 102 may retrieve the stored contact data from the central repository, compare the retrieved contact data to the locally cached contact data, update the locally cached contact data, if necessary, and only then populate the graphical user interface of the contact hovercard 112.

Figure 2:
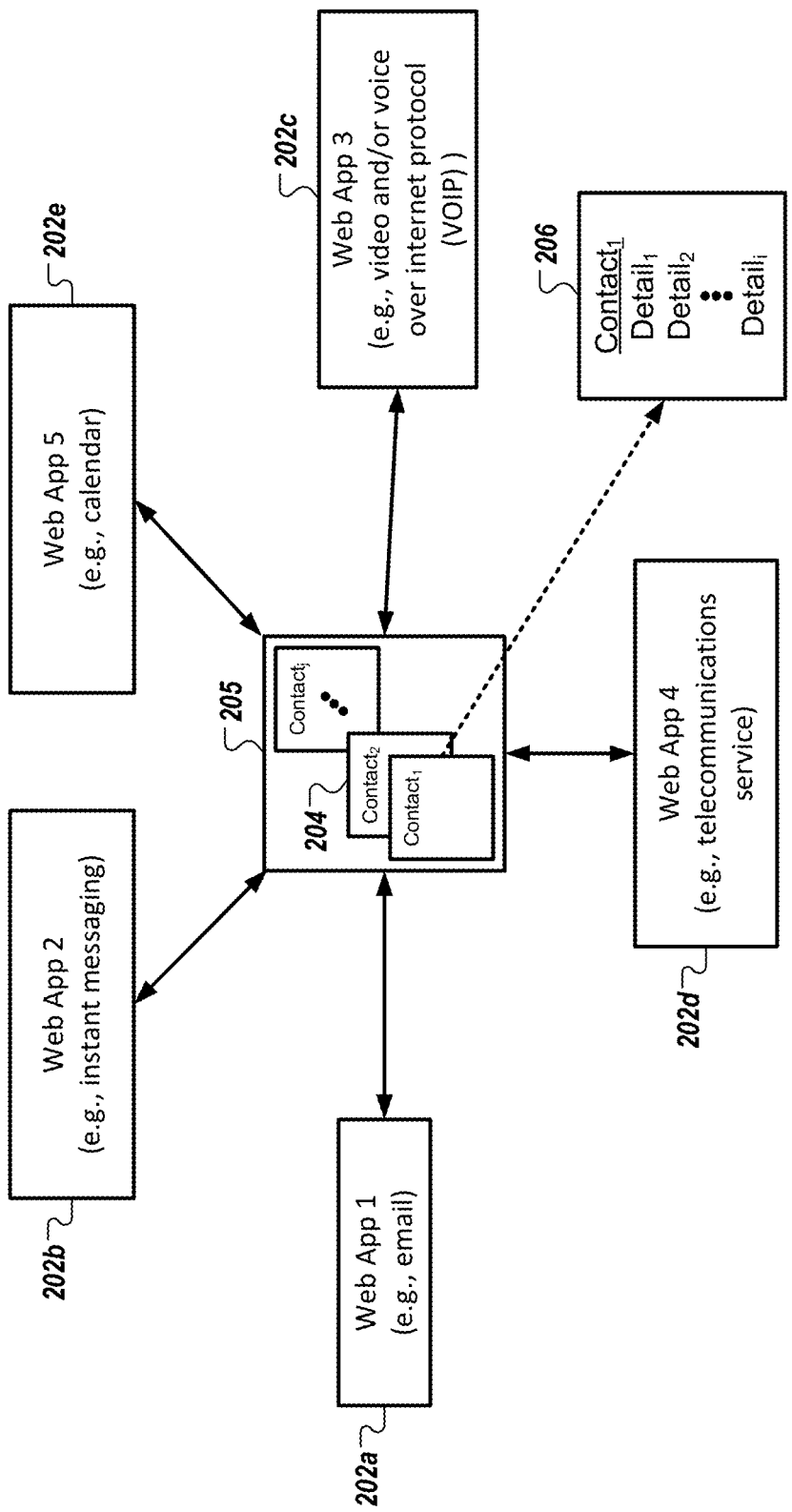
FIG. 2 illustrates multiple web based applications that can be launched from and provide access to a contact hovercard.

FIG. 2 illustrates multiple web based applications 202a-e that can be launched from and provide access to a contact hovercard 204. A contact can be selected from a contact list 205 using a mobile computing device (e.g., the mobile computing device 102). Contact data 206 for individual contacts (contact$_1$-contact$_j$) can be stored in a contact database (e.g., maintained at server system 108) and/or a local cache (e.g., digital memory of the mobile computing device). The web based applications 202a-e can be provide as a suite of applications. The web based applications 202a-e can include mobile productivity and communications applications that can include, for example, an email application 202a, an instant messaging application 202b, a video and/or VOIP application 202c, a telecommunications service application 202d, and a calendar application 202e. Contact data 206 that can be used to populate the contact hovercards 204 is stored for each contact (e.g., Contact$_1$-Contact$_j$). Contact data for each contact can include but is not limited to email addresses, phone numbers, and street addresses.

Referring to FIGS. 1 and 2, a user of the mobile computing device 102 can launch a web based application (e.g., email application 202a) from a contact hovercard 112, 204 and can access a contact hovercard 112, 204 from the web based application. A user selects an individual contact from a contact list (e.g., Alice Barker) to retrieve a corresponding contact hovercard 112, 204. Alice Barker's contact data can be stored in and retrieved from a central repository and/or can be locally cached at the mobile computing device 102. The contact hovercard (e.g., hovercard 112) can be invoked using a Universal Resource Locator (URL) that includes hash parameters. The URL for the contact hovercard 112 specifies the location of the contact hovercard (e.g., where the contact hovercard is stored in a central repository (e.g., server system 108)) and the mechanism for retrieving it. For example, the contact hovercard can be a HyperText Markup Language (HTML) web page stored in the central repository. The hash parameters specify the location of the contact data to populate the contact hovercard. In the example of FIGS. 1 and 2, the hash parameters specify Alice Barker's contact data stored in the central repository (e.g., contact$_1$ 206). Contact data 206 for Contact$_1$ is retrieved and used to populate the contact hovercard, resulting in contact hovercard 112, 204 being displayed on the touchscreen display 110.

Figure 3:
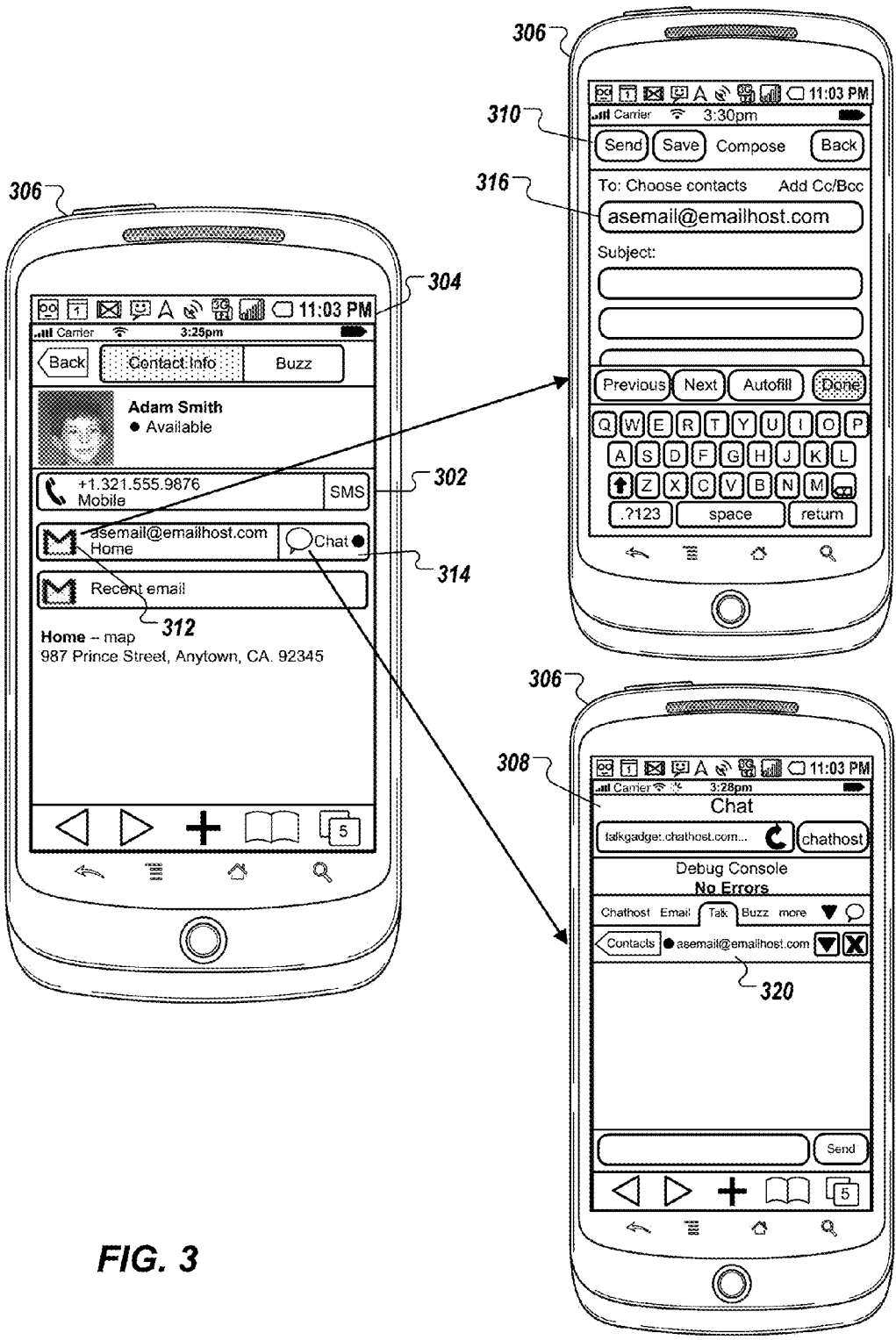
FIG. 3 illustrates a contact hovercard displayed on a mobile computing device and multiple web based applications that can be launched using the contact hovercard.

FIG. 3 illustrates a contact hovercard 302 displayed on a mobile computing device 306 and multiple web based applications (e.g., a social networking and messaging application (chat application 308, email application 310) that can be launched from the contact hovercard 302. A user of the mobile computing device 306 can invoke the launch of a web based application (e.g., email application 310) from the contact hovercard 302. The user can go back to the contact hovercard 302 from the web based application. In some implementations, the user can access another contact hovercard corresponding to a different contact from the web based application.

In operation, the user can select an individual contact (e.g., Adam Smith) from a contact list. The mobile computing device 306 displays the contact hovercard 302 corresponding to contact Adam Smith. The example contact hovercard 302 includes an email icon 312 and a chat icon 314. The user can launch a web based email application be selecting the email icon 312 (e.g., by pressing a region of the touchscreen display 304 that corresponds to the email icon 312). When invoked, the web based email application receives the selected contact data as input for pre-scripted functionality. For example, the web based email application can instantiate an email message with the email address contact data auto-populating the recipient dialogue box of the email. That is, the mobile computing device 306 displays an email application graphical user interface 310 to the user on the touchscreen display 304 that includes the contact data (e.g., email address 316).

In some implementations, the user can revert, or pivot, back to the contact hovercard that was used to invoke the executing web based application from the executing web based application. For example, from the web based email application, the user can revert back to the contact hovercard 302. The user can again select another icon from the contact hovercard 302 to invoke execution of a web based application. For example, the user can select the email icon 312 to again invoke execution of the web based email application. Alternatively, the user can select the chat icon 314 to invoke execution of a web based instant messaging application, to display a graphical user interface 308 of the application.

Although not illustrated, the user can access a contact list of the executing web based application. In some implementations, the contact list accessed through the web based application can be the same as a contact list accessed directly at the mobile computing device 306. The user can select a contact from the displayed contact list and mobile computing device 306 displays the hovercard 302 for the selected contact (e.g., Adam Smith).

In some implementations, a contact list for a user can be associated with a user profile that is shared among a suite of web based applications. The mobile computing device 306 launches and displays the contact hovercard 302. The user chooses to send the contact, Adam Smith, an email message, for example. The user selects the email icon 312 of the contact hovercard 302. A web based email application (e.g., email application 202a) is launched in response to the user selection, and the mobile computing device 306 displays the email application graphical user interface 310 to the user. The user can compose and send an email message to the selected contact. The user can close the web based application, can pivot back to the contact hovercard (e.g., the contact hovercard 302 for Adam Smith), or can pivot to another contact hovercard corresponding to a different contact. For example, the web based application can display a contact list corresponding to the user profile. The user can select a contact from the contact list and the contact hovercard corresponding to the selected contact is displayed. In this manner, the contact hovercard can provide a pivot or bridge between web based applications and/or contacts.

The user can continue to link to other web based applications by selecting icons on the contact hovercard that serve as hyperlinks to the applications. The contact hovercard can provide a common user interface for contact information that can be accessed from multiple web based applications. Additionally, the contact hovercard can act as a stepping stone or pivoting mechanism between one web based application to another web based application by providing links to each of the web based applications. The contact hovercard provides the contact information to the launched web based application.

In some implementations, a user can communicate with a contact selected from their contact list. The user can link to web based applications by selecting an icon on the contact hovercard for that contact that serves as a hyperlink to the application. The user can communicate with the contact. Once finished, the user can access the contact list from the application and select a different contact. A contact hovercard for the newly selected contact is displayed. The user can link to other web based applications by selecting icons on the contact hovercard for the newly selected contact. Again, the icons serve as hyperlinks to the applications in order to communicate with the newly selected contact. For example, the user can invoke a web based email application using a contact hovercard for a first contact (e.g., Adam Smith), can email the first contact, can select a second contact (e.g., Alice Barker) from a contact list presented by the web based email application, and can be presented with the contact hovercard for the second contact.

In some implementations, a desktop computing device includes a desktop display device. The desktop display device can provide a user with a larger display area than a touchscreen display device of a mobile computing device. The desktop computing device can display a contact hovercard over (on top of or "hovering over") the currently displayed web page for the web based application launching the contact hovercard. The functionality of the contact hovercard displayed on the desktop display device is similar to the functionality of the contact hovercard displayed by the mobile computing device.

Figure 4:
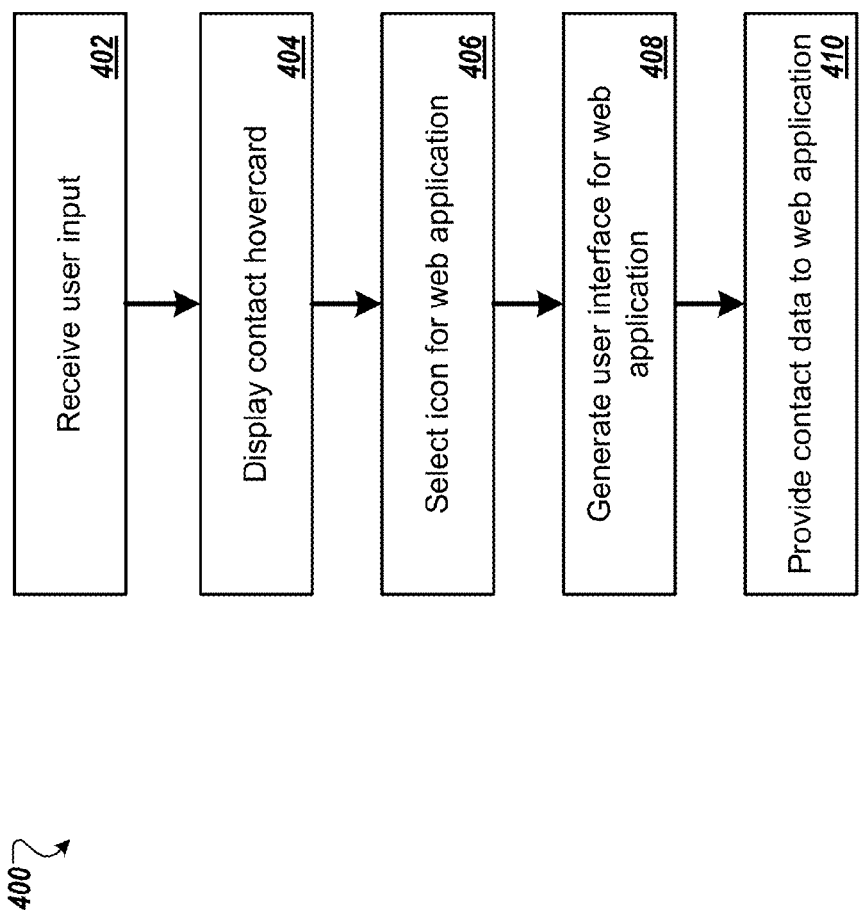
FIG. 4 illustrates an example process for launching a web based application from a contact hovercard.

FIG. 4 is a flowchart of an example process 400 for launching a web based application from a contact hovercard. For purposes of illustration, the process 400 is described with reference to FIG. 3. The process 400 begins when user input is received (402). For example, the user input can be provided as a selection of a contact (e.g., Adam Smith) from a contact list. A contact hovercard is displayed and includes first and second contact data (404). For example, the mobile computing device 306 displays contact hovercard 302 on the touchscreen display 304 of the mobile computing device 306. The first contact data can be provided as an icon and corresponds to a first web application, and the second contact data can be provided as an icon and corresponds to a second web application. The first web application and the second web application can be executed on one or more servers (e.g., server system 106).

An icon corresponding to one of the first web application and the second web application is selected (406). For example, a user decides to email the contact (e.g. Adam Smith) corresponding to the contact hovercard 302, and selects the email icon 312. On selection of the email icon 312, the mobile computing device 306 launches the email application (e.g., email application 202a shown in FIG. 2) on the mobile computing device 306. A user interface is generated for the selected web based application (408). For example, when launching the email application (e.g., email application 202) the graphical user interface 310 for the email application is generated and displayed to the user on the touchscreen display 304. Contact data is provided to the web based application (410) and the process ends. For example, when launching the email application (e.g., email application 202) using the hyperlink associated with the email icon 312 on contact hovercard 302, the mobile computing device 306 provides the contact data associated with the email icon 312 (e.g., email address 316) to the email application (e.g., email application 202).

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations and all of the functional operations described in this specification may be provided in digital electronic circuitry, or in computer software, firmware, or hardware, including the structures disclosed in this specification and their structural equivalents, or in combinations of one or more of them. Implementations may be provided as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

Elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be provided on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may be provided in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular implementations have been described. Other implementations are within the scope of the following claims. For example, the actions recited in the claims may be performed in a different order and still achieve desirable results.

What is claimed is:

1. A mobile computing device comprising a computer-readable medium coupled to one or more processors and having instructions stored thereon which, when executed by the one or more processors, cause the one or more processors to perform operations comprising:

displaying a first list of contacts;

receiving first user input that selects a first contact that is displayed in the first list of contacts;

displaying a contact hovercard on a user interface of the computing device in response to the first user input by populating a contact hovercard template with data associated with the first contact, including a first graphical user interface element associated with first contact data for the first contact and a second, differing graphical user interface element associated with second contact data for the first contact, wherein the first graphical user interface element corresponds to a first web application and the second, differing graphical user interface element corresponds to a second web application, wherein the first web application and the second web application are executed on one or more servers;

receiving second user input selecting the first graphical user interface element that is displayed in the contact hovercard;

in response to receiving the second user input, accessing the first web application over a network and updating the user interface to include a graphical representation of the first web application;

providing the first contact data as input to the first web application;

presenting, in the graphical representation of the first web application, a second list of contacts;

receiving third user input that selects a second contact that is displayed in the second list of contacts presented in the graphical representation of the first web application; and subsequent to providing the first contact data and in response to receiving the third user input, pivoting the user interface back to the contact hovercard by populating the contact hovercard template with data associated with the second contact.

2. The mobile computing device of claim 1, wherein the operations further comprise:

transmitting a request to the one or more servers; and receiving, from the one or more servers, the contact hovercard in response to the request.

3. The mobile computing device of claim 2, wherein the operations further comprise receiving, from the one or more servers, the first contact data and the second contact data in response to the request.

4. The mobile computing device of claim 1, wherein the first contact is same as the second contact and the operations further comprise:

subsequent to pivoting the user interface back to the contact hovercard, receiving fourth user input selecting the second graphical user interface element;

in response to receiving the fourth user input, accessing the second web application over the network and updating the user interface to include a graphical representation of the second web application; and providing the second contact data as input to the second web application.

5. The mobile computing device of claim 1, wherein the operations further comprise:
 accessing the second web application, the second web application displaying a third list of contacts on the user interface,
 receiving fourth user input that selects a third contact from the third list of contacts, and
 presenting, in response to receiving the fourth user input, the contact hovercard by populating the contact hovercard template with data associated with the third contact.

6. The mobile computing device of claim 1, wherein the first contact data and the second contact data are each displayed as a hyperlink to the first and second web applications, respectively.

7. The mobile computing device of claim 1, wherein the first web application and the second web application each comprise one of an email application, a social networking application, an instant messaging application, a telephone service application, a calendar application, and a video and/or voice over internet protocol (VOIP) application.

8. The mobile computing device of claim 1, wherein the first list of contacts comprises one or more contacts associated with a user profile of a user of the mobile device.

9. The mobile computing device of claim 1, wherein the contact hovercard further includes a third graphical user interface element associated with third contact data, the third graphical user interface element corresponding to a third web application that is executed on the one or more servers.

10. The mobile computing device of claim 1, wherein the operations further comprise:
 retrieving the contact hovercard template from computer memory; and
 retrieving the first contact data and the second contact data from computer memory.

11. The mobile computing device of claim 10, wherein the computer memory is provided at the one or more servers.

12. The mobile computing device of claim 10, wherein the computer memory is provided at the mobile computing device.

13. The mobile computing device of claim 1, wherein the operations further comprise:
 storing the first contact data and the second contact data in digital memory of the mobile computing device;
 receiving updated first contact data from the one or more servers in response to the first user input; and
 updating the first contact data using the updated first contact data.

14. A non-transitory machine-readable storage device encoded with a computer program, the program comprising instructions that when executed by data processing apparatus cause the data processing apparatus to perform operations comprising:
 displaying a first list of contacts;
 receiving first user input that selects a first contact that is displayed in the first list of contacts;
 displaying a contact hovercard on a user interface of the computing device in response to the first user input by populating a contact hovercard template with data associated with the first contact, including a first graphical user interface element associated with first contact data for the first contact and a second, differing graphical user interface element associated with second contact data for the first contact,
  wherein the first graphical user interface element corresponds to a first web application and the second, differing graphical user interface element corresponds to a second web application,
  wherein the first web application and the second web application are executed on one or more servers;
 receiving second user input selecting the first graphical user interface element that is displayed in the contact hovercard;
 in response to receiving the second user input, accessing the first web application over a network and updating the user interface to include a graphical representation of the first web application;
 providing the first contact data as input to the first web application;
 presenting, in the graphical representation of the first web application, a second list of contacts;
 receiving third user input that selects a second contact that is displayed in the second list of contacts presented in the graphical representation of the first web application; and
 subsequent to providing the first contact data and in response to receiving the third user input, pivoting the user interface back to the contact hovercard by populating the contact hovercard template with data associated with the second contact.

15. A computer-implemented method comprising:
 displaying a first list of contacts;
 receiving first user input that selects a first contact that is displayed in the first list of contacts;
 displaying a contact hovercard on a user interface of the computing device in response to the first user input by populating a contact hovercard template with data associated with the first contact, including a first graphical user interface element associated with first contact data for the first contact and a second, differing graphical user interface element associated with second contact data for the first contact,
  wherein the first graphical user interface element corresponds to a first web application and the second, differing graphical user interface element corresponds to a second web application,
  wherein the first web application and the second web application are executed on one or more servers;
 receiving second user input selecting the first graphical user interface element that is displayed in the contact hovercard;
 in response to receiving the second user input, accessing the first web application over a network and updating the user interface to include a graphical representation of the first web application;
 providing the first contact data as input to the first web application;
 presenting, in the graphical representation of the first web application, a second list of contacts;
 receiving third user input that selects a second contact that is displayed in the second list of contacts presented in the graphical representation of the first web application; and
 subsequent to providing the first contact data and in response to receiving the third user input, pivoting the user interface back to the contact hovercard by populating the contact hovercard template with data associated with the second contact.

16. The computer-implemented method of claim 15, wherein the first list of contacts is same as the second list of contacts.

17. The computer-implemented method of claim 15, wherein the first contact is same as the second contact.

18. The computer-implemented method of claim 15, further comprising:
- receiving, in response to pivoting the user interface to the contact hovercard, fourth user input selecting the second graphical user interface element that is displayed in the contact hovercard;
- in response to receiving the fourth user input, accessing the second web application over the network and updating the user interface to include a graphical representation of the second web application; and
- providing the second contact data as input to the second web application.

19. The computer-implemented method of claim 18, further comprising:
- presenting, in the graphical representation of the second web application, a third list of contacts;
- receiving fifth user input that selects a third contact that is displayed in the third list of contacts; and
- pivoting, in response to receiving the fifth user input, the user interface to the contact hovercard by populating the contact hovercard template with data associated with the third contact.

* * * * *